United States Patent [19]
Nordhoff

[11] 3,718,233
[45] Feb. 27, 1973

[54] BEER DISPENSING SYSTEM

[75] Inventor: John J. Nordhoff, Plano, Tex.

[73] Assignee: Magnetico International Inc., Dallas, Tex.

[22] Filed: March 5, 1971

[21] Appl. No.: 121,427

[52] U.S. Cl. .................................. 222/70, 251/138
[51] Int. Cl. .............................................. B67d 5/08
[58] Field of Search ..................... 251/138; 222/70

[56] References Cited

UNITED STATES PATENTS

| | | | |
|---|---|---|---|
| 3,257,033 | 6/1966 | Stott | 222/70 X |
| 2,194,276 | 3/1940 | Carlson | 251/138 X |
| 3,107,705 | 10/1963 | Isserstedt | 222/70 X |
| 3,408,036 | 10/1968 | Smith et al. | 251/138 |

*Primary Examiner*—Stanley H. Tollberg
*Attorney*—Richards, Harris & Hubbard

[57] ABSTRACT

A beer dispensing system includes at least one tap for automatically dispensing either the exact quantity of beer necessary to fill a glass or the exact quantity of beer necessary to fill a pitcher, and a computer for recording each dispensing operation of the tap. The tap comprises a modified Perlick valve, a bell crank coupled to the actuating lever of the valve, and a solenoid for operating the bell crank to open the valve. Electronic timing circuitry is provided for energizing the solenoid for predetermined periods of time and thereby dispensing the desired quantities of beer. The tap further comprises an add-a-head lever for manual actuation to open the valve a slight amount and thereby dispense foam.

10 Claims, 5 Drawing Figures

INVENTOR
JOHN J. NORDHOFF

Richards, Harris & Hubbard
ATTORNEYS

INVENTOR:
JOHN J. NORDHOFF

BEER DISPENSING SYSTEM

BACKGROUND AND SUMMARY OF THE INVENTION

This invention relates to a beer dispensing system, and more particularly to a fully automatic system for filling both glasses and pitchers with beer.

The advantage of an automatic beer dispensing system have been apparent for quite some time. For example, see U.S. Pat. No. 3,248,009 granted to Sutton et al on Apr. 26, 1966, U.S. Pat. No. 3,355,068 granted to Harland et al on Nov. 28, 1967, and U.S. Pat. No. 3,380,629 granted to Kontra et al on Apr. 30, 1968. Unfortunately, notwithstanding the foregoing and other attempts at providing a workable automatic beer dispensing system, a number of problems have remained unsolved. Thus, the Sutton et al and Kontra et al systems require separate dispensing mechanisms for filling glasses and pitchers, and the Harland et al system does not adequately solve the problem of renewing the head on a glass or pitcher that has been left standing too long.

The present invention relates to a novel beer dispensing system which overcomes the foregoing and other disadvantages that are characteristic of the prior art. In accordance with the preferred embodiment of the invention, a single valve is operated by dual electronic timing circuits to dispense sufficient beer to fill a glass and to fill a pitcher, respectively. Additionally, a manually operable lever is provided for actuating the valve to dispense foam.

DESCRIPTION OF THE DRAWINGS

A more complete understanding of the invention may be had by referring to the following Detailed Description when taken in conjunction with the accompanying Drawings, wherein:

FIG. 3 is a view similar to FIG. 2 showing the component parts of the dispensing tap in an "off" condition;

DETAILED DESCRIPTION

Figure 1:
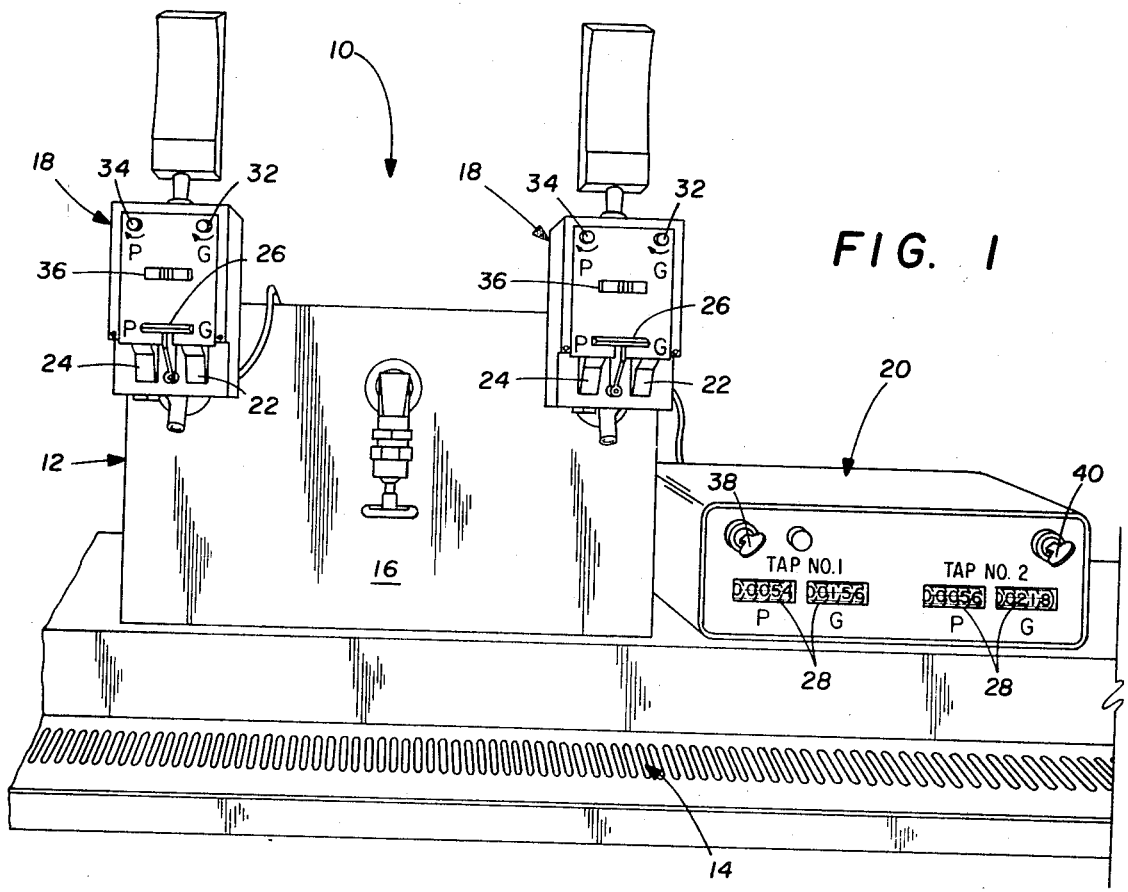
FIG. 1 is an illustration of a beer dispensing system incorporating the invention.

Referring now to the Drawings, and particularly to FIG. 1 thereof, there is shown a beer dispensing system 10 incorporating the present invention. The beer dispensing system 10 includes a conventional beer service facility 12 comprising a sink 14 and a housing 16 which encloses both one or more kegs of beer and conventional compressing and refrigeration equipment. A pair of identical dispensing taps 18 control the flow of beer from the housing 16 to a service area located between the taps 18 and the sink 14. The dispensing taps 18 are in turn controlled by a computer 20.

Each dispensing tap 18 includes a glass pushbutton 22, a pitcher pushbutton 24, and an add-a-head lever 26. In the use of the beer dispensing system 10, a glass or pitcher is positioned under one of the taps 18, after which the appropriate pushbutton 22 or 24 is depressed. This causes the tap 18 to dispense either the exact quantity of beer necessary to fill a glass or the exact quantity of beer necessary to fill a pitcher. The computer 20 includes a plurality of digital counters 28 each corresponding to one of the pushbuttons of one of the taps 18. The computer 20 advances each counter 28 one digit each time its respective pushbutton is depressed, and in this manner records the total quantity of beer that has been dispensed through the beer dispensing system 10.

It will be understood that when a glass or pitcher is filled with beer, a head forms on top of the beer. It is considered highly desirable that the head be at least substantially intact when the beer is served. It will be further understood that if a glass or a pitcher of beer is allowed to stand too long before it is served, the head becomes substantially dissipated. Whenever this occurs, the glass or pitcher is positioned in the service area beneath one of the taps 18, and the add-a-head lever 26 of the tap is then pulled. This actuates the tap 18 to dispense foam, whereby the head on the glass or pitcher is renewed.

Each dispensing tap 18 further includes a glass quantity control knob 32, a pitcher quantity control knob 34, and a slider switch 36. The knobs 32 and 34 of each tap 18 regulate the quantity of beer that is dispensed in response to the actuation of the pushbuttons 22 and 24 of the tap, respectively.

The slider switches 36 of the dispensing taps 18 function in conjunction with a pair of key-operated switches 38 and 40 on the computer 20 to control the operating modes of the beer dispensing system 10. Thus, whenever the switch 38 is in an "on" condition, the slider switches 36 of the taps 18 may be manipulated to turn the taps "on" or "off." Similarly, whenever the switch 40 is in a "purge" condition, the slider switches 36 may be operated to direct a cleaning solution through the taps 18. The latter function is carried out independently of the counters and the control circuits of the computer 20, whereby the dispensing taps 18 of the beer dispensing system 10 may be thoroughly cleaned without chaning the readings on the counters 28.

From the foregoing, it will be understood that the beer dispensing system 10 operates in response to depression of the pushbuttons 22 and 24 of the dispensing taps 18 to automatically fill glasses and pitchers with beer. It is contemplated that the keys which operate the switches 38 and 40 of the computer 20 will remain in the possession of the owner of the beer dispensing system 10, but that the actual operation of the system will be under the control of bartenders or other service personnel. The beer dispensing system 10 is readily adapted to such circumstances in that the dispensing taps 18 prevent the dispensing of anything other than a full glass or a full pitcher of beer, and in that the computer 20 records each dispensing operation as it occurs. By this means, both "free samples" and outright thievery on the part of service personnel are completely eliminated. It is further contemplated that it will often be convenient to locate the computer 20 at a point remote from the service facility 12, such as in the office of the owner of the beer dispensing system 10, etc.

Figure 2:
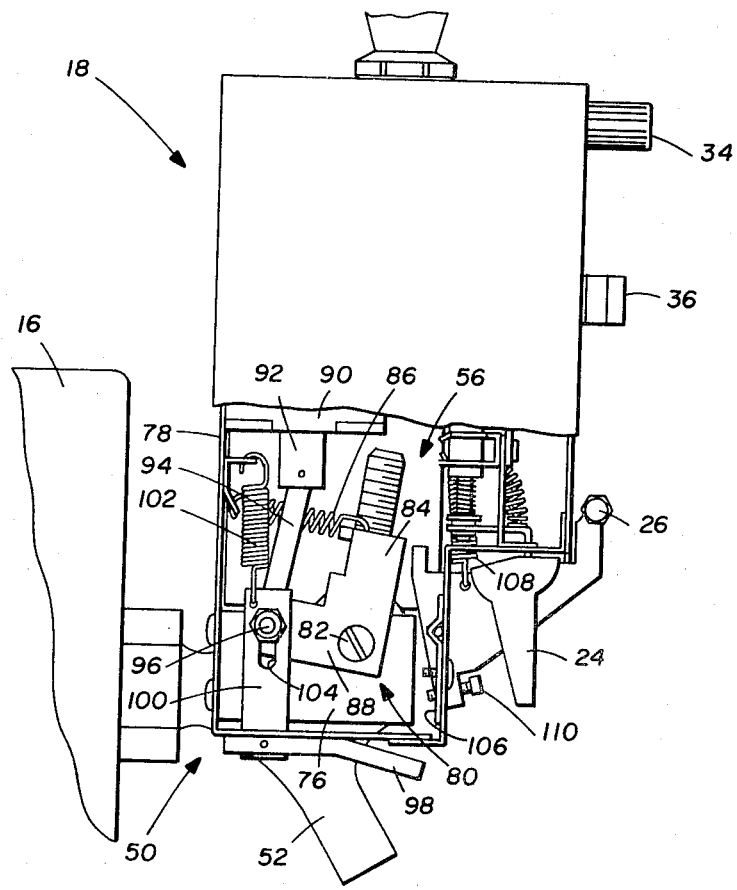
FIG. 2 is a side view of one of the dispensing taps of the beer dispensing system shown in FIG. 1.
Figure 4:
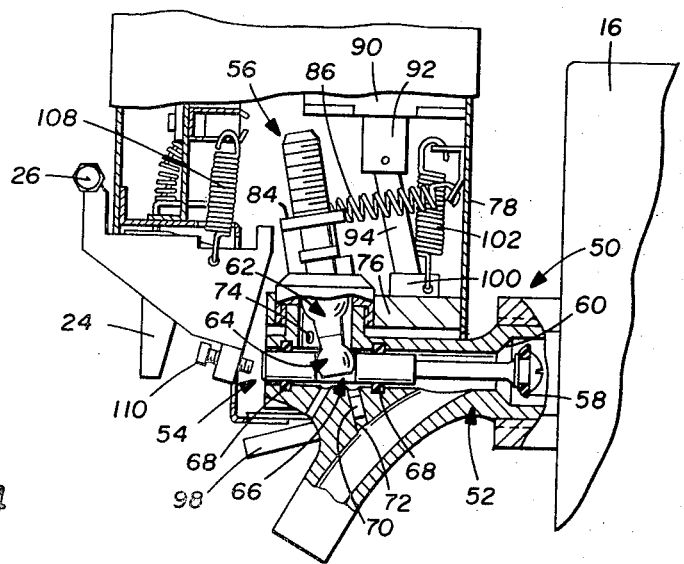
FIG. 4 is a sectional view of the dispensing tap shown in FIG. 2.

Referring now to FIGS. 2, 3 and 4 the structural details of one of the dispensing taps 18 of the beer dispensing system 10 are shown. Referring particularly to FIG. 4, each tap 18 includes a valve 50 of the type manufactured by the Perlick Manufacturing Company, and known in the art as a Perlick valve. The valve 50 includes a valve body 52 for directing beer from he housing 16 to the service area, a valve stem 54 slidably supported in the valve body for controlling the flow of beer therethrough, and an actuating lever 56 pivotally supported on the valve body for manipulating the valve stem between a flow preventing position and a flow permitting position. More particularly, the valve stem 54 extends to a sealing member 58 which is normally positioned in engagement with a valve seat 60 formed in the valve body 52 to prevent the flow of beer through the valve body. The actuating lever 56 is supported for pivotal movement about a horizontal axis by a ball and socket joint 62, and includes a bifurcated portion 64 which is received in a cutaway portion 66 of the valve stem 54. By this means, the angular position of the actuating lever 56 controls the open and closed condition of the valve 50.

Those skilled in the art will notice certain variations between the valve 50 illustrated in FIG. 4 and a standard Perlick valve. First, the valve stem 54 is of reduced diameter, and is supported in a pair of O-rings 68 formed from a low friction material, such as polytetrafluoroethylene. By this means, the force necessary to manipulate the valve stem 54 between the flow preventing and the flow permitting positions is greatly reduced, as is the tendency of the valve to stick. The valve 50 further differs from a standard Perlick valve in that a plug 70 is positioned in a passageway 72 that is characteristic of Perlick valves. The function normally performed by the passageway 72 is performed in the valve 50 by a vent passageway 74 formed through the upper portion of the valve body 52.

Each tap 18 further includes a mounting block 78 which is secured to the valve body 52 of the valve 50, and a housing 78 which is secured to the mounting block 76. As is best shown in FIG. 2, a bell crank 80 is pivotally supported on the mounting block 76 by a fastener 82 and includes an arm 84 which is connected to the actuating lever 56 of the valve 50. A spring 86 is connected between the arm 84 and the housing 78. The spring 86 urges the bell crank 80 to pivot counterclockwise (FIG. 2), and thereby normally positions the valve stem 54 of the valve 50 in the flow preventing position.

The bell crank 80 further includes an arm 88 which extends at right angles with respect to the arm 84. A solenoid 90 is supported on the housing 78 above the bell crank 80 and includes a plunger 92. The plunger 92 is connected to the arm 88 of the bell crank 80 through a link 94 and a fastener 96.

In the operation of the dispensing tap 18, the solenoid 90 is normally deenergized, and the plunger 92, the link 94, the bell crank 80 and the acutating lever 56 are therefore normally positioned as shown in FIG. 3. Whenever one of the pushbuttons 22 or 24 of the tap 18 is depressed, the solenoid 90 is energized, whereupon the plunger 92 is drawn upwardly and the bell crank 80 and the acutating lever 56 are pivoted against the action of the spring 86 from the position shown in FIG. 3, to the position shown in FIG. 2. This action opens the valve 50, whereupon beer flows from the housing 16 through the valve body 52 to the serving area. It will be appreciated that the amount of beer that is dispensed responsive to actuation of one of the pushbuttons 22 or 24 depends entirely upon the period of time that the solenoid 90 remains energized.

Due to the nature of beer, it is possible for the valve stem 54 of the valve 50 to become stuck in the flow permitting position. To this end, a lever 98 is pivotally supported on a link 100, and a link 100 is in turn supported on the housing 78 by a spring 102. An elongate slot 104 formed through the link 100 receives the fastener 96 and forms a lost motion connection therewith. Thus, whenever the lever 98 is positioned shown in FIG. 2, the bell crank 80 is free to pivot about the fastener 82 under the action of the solenoid 90 and the spring 86. However, whenever the lever 98 is manipulated to the position shown in FIG. 3, the bell crank 80 is forced to pivot counterclockwise (FIG. 3) about the fastener 82. Thus, should the valve stem 54 become stuck in the flow permitting position, the lever 98 is manipulated from the position shown in FIG. 2 to the position shown in FIG. 3, whereby the valve stem 54 of the valve 50 is mechanically forced out of the flow permitting position and into the flow preventing position.

As is best shown in FIG. 3, the add-a-head lever 26 is pivotally supported by a bracket 106 that is secured to the housing 78. A spring 108 is connected between the lever 26 and the housing 78, and functions to urge the lever 26 toward the position shown in FIG. 3. As is best shown in FIG. 4, a screw 110 is mounted in the lower end of the lever 26 for engagement with the valve stem 54 of the valve 50 in response to pivotal movement of the lever 26 against the action of the spring 108.

When the screw 110 engages the valve stem 54, the valve stem is displaced away from the flow preventing position and toward the flow permitting position. The distance that the valve stem 54 is displaced in response to actuation of the lever 26 depends upon the position of the screw 110 in the lever 26, and is carefully chosen so that liquid beer is not dispensed upon actuation of the add-a-head lever 26. Instead, the distance that the valve stem 54 is displaced from the flow preventing position is adjusted to cause the beer to fracture as it passes between the sealing member 58 and the valve seat 60. By this means, the discharge of foam in response to actuation of the add-a-head lever 26 is assured.

Figure 5:
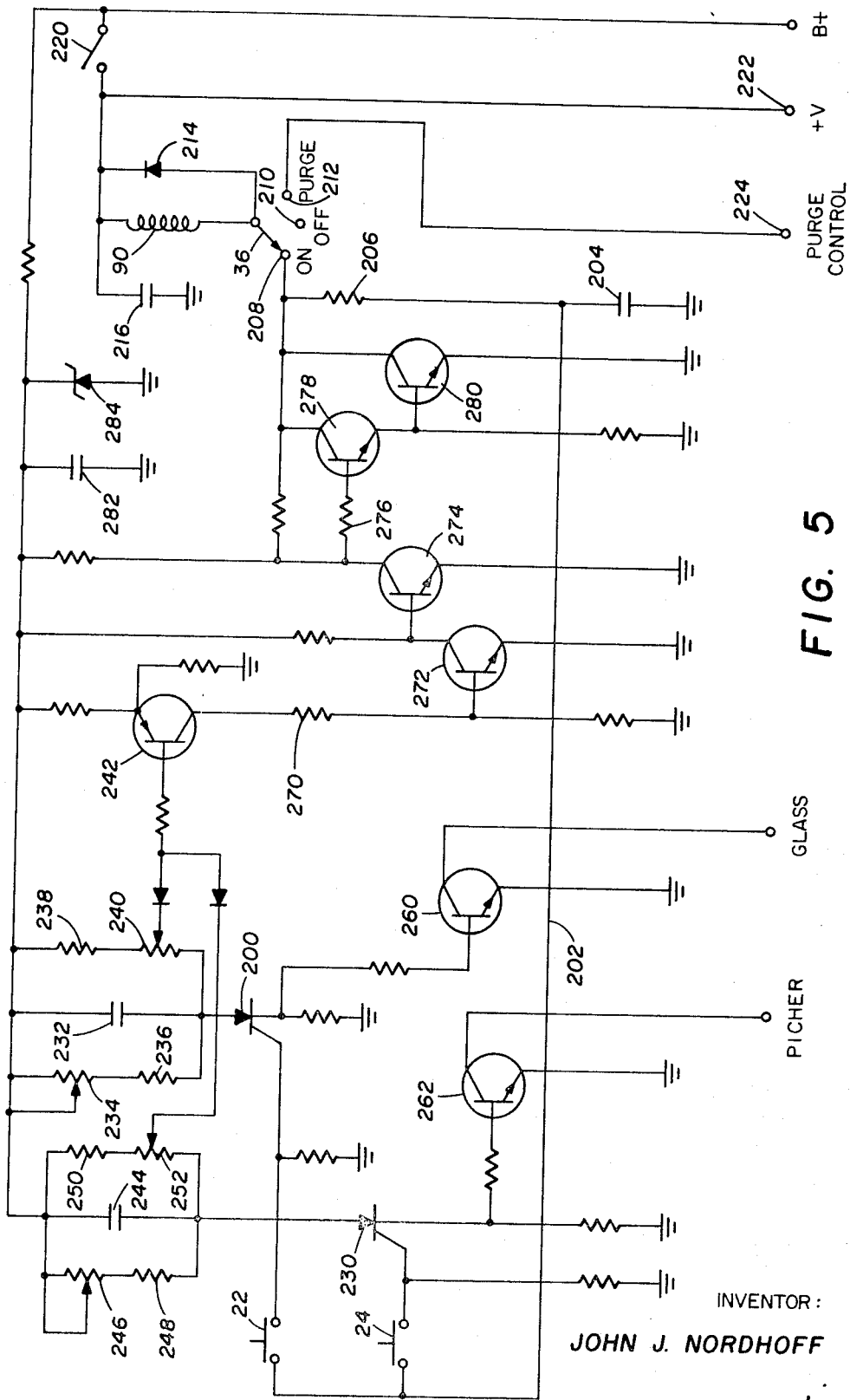
FIG. 5 is a schematic illustration of electronic circuitry employed in the beer dispensing system shown in FIG. 1.

Referring to FIG. 5, electronic circuitry for timing control of the beer dispensing system 10 is illustrated. The glass pushbutton 22 is operable to interconnect the gate of a silicon control rectifier 200 via a lead 202 to the juncture of a capacitor 204 and a resistor 206. A terminal of the resistor 206 is connected to an "on" terminal 208. The slider switch 36 is movable between the "on" terminal 208, an "off" terminal 210 and a "purge" terminal 212 in the manner previously described. The slider switch 36 is connected to a terminal of the solenoid 90. A diode 214 is connected across the solenoid 90 to eliminate stored inductive energy spikes during operation of the solenoid. A capacitor 216 is connected between the solenoid 90 and the circuit ground. A microswitch 220 is connected between the solenoid 90 and a source of supply voltage from the computer 20. In the preferred embodiment, this voltage is 35 volts. An important aspect of the invention is the use of step down transformers within the computer 20 to reduce normal line voltage to 35 volts and thereby prevent electrical shock to service personnel. A terminal 222 is connected to a small resistor connected to the B+ supply in order to provide a lower voltage of about 10 volts for normal operation of the system. A terminal 224 is connected to the purge terminal 212 in order to short out the metering and timing circuitry of the invention during purging operations.

The glass pushbutton switch 22 is operable to connect the lead 202 to the gate of a silicon control rectifier 230. The anode of the SCR 200 is connected to an RC timing circuit comprising a capacitor 232 and a plurality of resistors 234–240. The resistor 240 comprises a potentiometer which is adjusted by rotation of the glass quantity control knob 32. Operation of the potentiometer 240 enables variation of the timing cycle during the filling of a glass with beer. The potentiometer 240 is connected to the base of a transistor 242 which acts as a level sensing transistor as will be subsequently described.

The anode of the SCR 230 is also connected to a timing network comprising a capacitor 244 and a plurality of resistors 246–252. The resistor 252 comprises a potentiometer which is varied by rotation of the pitcher quantity control knob 34. The potentiometer 252 is also connected to the base of the transistor 242. The cathode of the SCR 200 is connected to the base of a transistor 260, the collector of which is applied to the glass counting mechanism in the computer 20. The cathode of the SCR 230 is also connected through a suitable resistance to the base of a transistor 262, the collector of which is connected to the pitcher counting mechanism in the computer 20.

The collector of the level sensing transistor 242 is connected through a resistor 270 to the base of a transistor 272. The collector of the transistor 272 is connected to the base of a transistor 274, the collector of which is connected through a resistor 276 to the base of a transistor 278. The transistor 278 is connected to the base of a transistor 280. The transistors 272, 274, 278 and 280 comprise an amplifying circuit for driving the solenoid 90. The collector of the transistor 280 is connected through the slider switch 36 to the solenoid 90. A capacitor 282 is connected in parallel with a Zener diode 284 to filter out electrical transients caused by external disturbances.

In operation of the circuitry shown in FIG. 5, one of the pushbuttons 22 or 24 is depressed. Assuming that the pushbutton 22 is depressed, the SCR 200 is fired, thereby energizing transistor 260 to cause one of the counters 28 to advance one count. Upon the firing of the SCR 200, the capacitor 232 begins to charge and thus maintains current flow through the SCR 200 for a predetermined time interval dependent upon the adjustment of the potentiometer 240. During charging of the capacitor 232, the transistor 242 senses a predetermined voltage level and thus turns on transistors 272, 274, 278 and 280 in order to energize the solenoid 90. Depression of the pushbutton 22 also causes a voltage stored upon the capacitor 216 to discharge through the solenoid 90 to assist the solenoid to initially energize to open the valve 50. As the valve is opened, the microswitch 220 is opened to reduce the voltage applied to the solenoid 90 and the remainder of the circuitry for the duration of the timing cycle.

After the capacitor 232 becomes fully charged, the SCR 200 is turned off, and the capacitor 232 discharges through the associated resistors. Discharge of the capacitor 232 turns the transistor 242 off, and thereby deenergizes the amplifier to deenergize the solenoid 90. The deenergization of the solenoid 90 closes the valve 50 and also closes the microswitch 220. Depression of the pushbutton 24 will cause operation of the circuitry in an identical manner, except that the capacitor 242 and its associated resistors provides the timing circuitry therefore in order to dispense a larger volume of beer.

Those skilled in the art will appreciate the fact that the embodiment of the invention illustrated in the Drawings can be modified in order to suit particular needs. For example, the invention is not limited to dispensing systems comprising two taps, but instead can employ from one to as many taps as are required. Similarly, it would be possible to modify the taps to incorporate additional pushbuttons which actuate the taps to dispense quantities of beer corresponding to different sizes of glasses, pitchers, etc. Finally, the invention is not limited to beer dispensing systems, but can instead be used in dispensing systems for other liquids with equal facility.

It will thus be seen that the present invention provides a beer dispensing system which may be economically constructed and maintained due to its simplicity of mechanical and electrical construction. The solid state timing control circuitry of the invention enables accurate control of the amount of beer dispensed from the system, while simultaneously allowing selective variation of the amount of beer dispensed. The unique valve control mechanism of the invention enables the use of a generally conventional Perlick valve which has been long proven in commercial usage. The manual override lever enables operator control of the system in case the valve stem becomes stuck.

The add-a-head lever feature of the invention provides a dual function of enabling dispensing of foam, while also enabling wetting of the dispensing unit prior to use after a period of inactivity. The purge apparatus of the system enables cleaning of the system while eliminating invalidating the count stored in the computer. The entire system is constructed to substantially reduce the sticking that often characterizes beer dispensing systems, with the use of polutetrafluoroethylene O-rings and other features.

Although the preferred embodiment of the invention has been illustrated in the accompanying Drawings and described in the foregoing specification, it will be understood that the invention is not limited to the embodiment disclosed, but is capable of rearrangement, modification and substitution of parts and elements without departing from the spirit of the invention.

I claim:

1. In a beer dispensing system the improvement comprising:
   a Perlick valve for normally preventing the flow of beer from a source to a dispensing area;

means for automatically opening the Perlick valve for a first predetermined period of time and thereby dispensing a first predetermined quantity of beer, means for automatically opening the Perlick valve for a second predetermined period of time and thereby dispensing a second predetermined quantity of beer, a manually operable lever system independent of the valve opening means for actuating the Perlick valve to dispense foam, and means for restricting the extent to which the Perlick valve is opened by the manually operable lever system and thereby preventing the dispensing of liquid beer by means of the lever system.

2. The beer dispensing system according to claim 1 wherein the valve opening means include means for varying the predetermined periods of time and thereby adjusting the predetermined quantities of beer.

3. The beer dispensing system according to claim 1 wherein the valve opening means include a solenoid for opening the Perlick valve and electronic timing means for selectively operating the solenoid for the first and second predetermined periods of time.

4. In a beer dispensing system, the improvement comprising:

a Perlick valve for normally preventing the flow of beer from a source to a dispensing area;

means for automatically opening the Perlick valve for a first predetermined period of time and thereby dispensing a first predetermined quantity of beer;

means for automatically opening the Perlick valve for a second predetermined period of time and thereby dispensing a second predetermined quantity of beer, said opening means comprising a solenoid for opening the Perlick valve and electronic timing means for selectively operating the solenoid for the first and second predetermined periods of time, said electronic timing means comprising first and second capacitors for storing voltage, and amplifier means operable in response to the voltage across said capacitors for driving the solenoid.

5. In a beer dispensing system, the improvement comprising:

a Perlick valve for normally preventing the flow of beer from a source to a dispensing area;

means for automatically opening the Perlick valve for a first predetermined period of time and thereby dispensing a first predetermined quantity of beer;

means for automatically opening the Perlick valve for a second predetermined period of time and thereby dispensing a second predetermined quantity of beer, said valve opening means comprising a solenoid for opening the Perlick valve and electronic timing means for selectively operating the solenoid for the first and second predetermined periods of time; and means for initially applying a voltage to operate the solenoid and for subsequently applying a lower voltage to operate the solenoid.

6. The beer dispensing system according to claim 1 further including override means for mechanically closing the Perlick valve notwithstanding the action of the valve opening means.

7. A fluid dispensing system comprising:

a valve including a valve body for directing fluid from a source to a dispensing area, a valve stem slidably supported in the valve body for controlling the flow of fluid therethrough, and an actuating lever connected to the valve stem and supported for pivotal movement about a first axis to move the valve stem between flow permitting and flow preventing positions;

a second lever comprising a bell crank supported for pivotal movement about a second axis and including a first arm connected to the actuating lever and a second arm;

a solenoid including a plunger connected to the second arm of the bell crank for selective actuation to pivot the levers and thereby control the flow of fluid through the valve;

a third lever supported for pivotal movement between first and second positions; and a lost motion connection between the third lever and the bell crank for permitting pivotal movement of the bell crank under the actuation of the solenoid when the third lever is in one of its positions and for actuating the bell crank and the actuating lever to move the valve stem to the flow preventing position when the third lever is in the other of its positions.

8. The fluid dispensing system according to claim 7 further including means for automatically actuating the solenoid for first and second predetermined periods of time and thereby dispensing first and second predetermined quantities of fluid through the valve.

9. A beer dispensing system comprising:

a valve including a valve body for directing beer from a source to a dispensing area, and a valve stem slidably supported in the valve body for controlling the flow of beer therethrough;

a first lever supported for pivotal movement about an axis between first and second positions and operatively connected to the valve stem of the valve for moving the valve stem through a predetermined distance from a position wherein beer is permitted to flow through the valve body to a position wherein beer is prevented from flowing through the valve body;

a solenoid including a plunger connected to the lever for selective actuation to pivot the lever and thereby control the flow of beer to the valve;

means normally positioning the valve stem in the flow-preventing position;

a second independent lever for selective manual actuation to displace the valve stem from the flow-preventing position through a portion of the predetermined distance and thereby actuate the valve to dispense beer foam; and means for limiting the extent to which the valve is opened by the second lever and thereby preventing the dispensing of liquid beer by means of the second lever.

10. In a beer dispensing system of the type including a valve body for directing beer from a source to a dispensing area, a valve stem slidably supported in the valve body for controlling the flow of beer therethrough, and a lever pivotally supported for selective actuation to move the valve stem from a normal flow preventing position to a flow permitting position, the improvement comprising:

means connected to the actuating lever for automatically moving the valve stem a predetermined distance from the flow preventing position to the flow permitting position for a predetermined period of time and thereby dispensing a predetermined quantity of beer; and a manually operable lever supported for pivotal movement independent of the actuating lever into engagement with a portion of the valve stem to selectively displace the valve stem from the flow preventing position toward the flow permitting position and through a predetermined portion of the predetermined distance and thereby dispensing foam through the valve body.

* * * * *